3,347,925
DIFLUOROAMINO-SUBSTITUTED NITRAMINES
AND METHOD OF PREPARATION
William E. Tyler III, New Providence, and John R. Lovett, Edison, N.J., assignors to Esso Research and Engineering Company, a corporation of Delaware
No Drawing. Filed Sept. 11, 1962, Ser. No. 224,884
8 Claims. (Cl. 260—583)

This invention relates to high-energy organic oxidizers that contain difluoramino (—$NF_2$) and primary nitramine (—$NHNO_2$) groups, and to the preparation of these compounds.

More particularly, the present invention is concerned with making available novel, normally solid, primary dinitramines which contain difluoramino groups and have utility as exceptionally good components of solid rocket propellants.

Primary alkyl nitramines have been known to be difficult to prepare and to isolate. Accordingly, it is surprising that the new primary dinitramines containing $NF_2$ groups which increase the energy of these compounds can be safely prepared and isolated. These new primary dinitramines can be used for conversion to higher energy nitrate esters.

In U.S. application S.N. 181,831, filed March 19, 1962, for William Tyler III and John R. Lovett, is described a method for converting to nitrate ester derivatives nitramines made by any suitable method. The present application is a continuation-in-part of the said application and discloses a particularly improved method for obtaining such nitramines and for preparing and isolating dinitramines which had not been previously available.

The method of the present invention for preparing primary nitramines has been found effective where other methods for preparing the nitramines failed, particularly in preparing a dinitramine, such as 1,2-bis-($NF_2$) ethylene dinitramine, which may be termed 1,2-bis-difluoramino-1,2-bis-nitramino ethane, and which has the formula:

$$(NHNO_2)CH(NF_2)CH(NF_2)(NHNO_2)$$

Unsaturated isocyanates which can be prepared from the unsaturated organic acids and which can be reacted with $N_2F_4$ to produce $NF_2$-containing derivatives of the isocyanates are useful as starting materials for preparing the nitramines in accordance with the present invention. The $NF_2$-containing isocyanates useful as starting materials are represented by the following general formula: $R(NF_2)_a(NCO)_b$ wherein R represents the substituted organic compound radical of the group consisting of alkanes having 2 to 6 carbon atoms, cyclohexane and tetrahydrofuran having the $NF_2$ group substituents attached to the carbon atoms interlinked therein; the subscript $a$ signifying the number of at least 2 to the total number of carbon atoms in the compound to which the $NF_2$ groups are linked; and the subscript $b$ signifying that 1 to 2 of the isocyanato (NCO) groups linked to 1 to 2 of the carbon atoms.

Representative isocyanate reactants within this formula are 1,2-bis-($NF_2$)-ethyl isocyanate, having the formula $CH_2(NF_2)CH(NF_2)(NCO)$, 1,2 - bis-($NF_2$)-1,2-diisocyanato ethane having the formula $$(NCO)CH(NF_2)CH(NF_2)(NCO)$$

2,3-bis-($NF_2$)-1,4-diisocyanato butane having the formula $(NCO)CH_2CH(NF_2)CH(NF_2)CH_2(NCO)$, 1,2,3,4-tetrakis-($NF_2$)-1,4-diisocyanato butane having the formula $$(NCO)CH(NF_2)CH(NF_2)CH(NF_2)CH(NF_2)(NCO)$$

1,2-bis-($NF_2$)-1,1-diisocyanato ethane having the formula $CH_2(NF_2)C(NF_2)(NCO)_2$, difluoramino - cyclohexane diisocyanates of 2 to 6 $NF_2$ group substituents, and tetrakis-($NF_2$)-furan diisocyanate having the formula $$C_4H_2O(NF_2)_4(NCO)_2$$

In the new method of the present invention for making nitramines from the kinds of isocyanates described, an isocyanate is reacted with formic acid to convert the isocyanate to a formamide, then the formamide obtained is reacted with nitric acid to form a nitro-substituted amide which is then reacted by hydrolysis to obtain removal of the carbonyl group and to form the nitramine function in place of the isocyanato function which was present in the starting material. The reaction series is represented as follows:

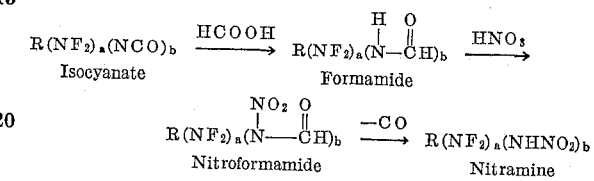

Primary dinitramines have thus been obtained through the amide and nitroamide route with surprisingly high suitability for use as such, or for producing derivatives such as the corresponding nitrate esters in which $$(-ONO_2)$$

groups replace the isocyanato (—NCO) groups.

In the initial step, the starting isocyanate is reacted to form the amide by being dissolved in an inert diluent such as a halogen-substituted alkane, e.g. methylene chloride. Other inert liquid diluents may be used and the reaction temperature is preferably in the range of about 0° to 40° C., preferably from 20° to 30° C. Formic acid is reacted with the isocyanate reactant to convert the isocyanate functions to the foramide functions (—NHCHO). The intermediate formamide product thus prepared can be separated from the solvent or diluent and from excess formic acid reactant and has been found to be satisfactorily stable.

The nitrolysis of the formamide was carried out with trifluoroacetic anhydride and 98 to 100% white nitric acid. Other nitrating mixtures may be used. The product resulting from the nitrolysis may be considered to be a nitroformyl amine or nitro-substituted formamide in that the functional group is —$N(NO_2)CHO$. The nitramines are obtained from the nitroformyl amine or nitro-substituted formamide compounds through a decarbonylation reaction. This decarbonylation may be effected by acid hydrolysis with water to formic acid and the nitramine or by direct catalytic removal of CO.

The following examples show satisfactory demonstrations of the invention.

EXAMPLE 1

*1,2-bis-(difluoramino)-ethylene diformamide*

$$OHCHNCH(NF_2)CH(NF_2)NHCHO$$

1.2 ml. (1.8 g.) of 1,2-bis-(difluoramino)-ethylene diisocyanate was dissolved in 40 ml. of purified $CH_2Cl_2$, cooled to 0° C. and 3 ml. of 98 to 100% $HCO_2H$ added slowly. The reaction was allowed to come to room temperature and stirred overnight. The mixture was filtered to yield 1.6 g. of white solid product, which after recrystallization, showed a melting point of 200° to 203° C. and had the following chemical analyses:

Calc'd for $C_4H_6F_4N_4O_2$: C, 22.0%; N, 25.7%; F, 34.9%. Found: C, 20.6%; N, 25.9%; F, 34.1%.

The infrared and above analysis are consistent with the structure of 1,2-bis-(difluoramino)-ethylene diformamide.

*1,2-bis-(difluoramino)-ethylene dinitrodiformamide*
$$OHC(NO_2)NCH(NF_2)CH(NF_2)N(NO_2)CHO$$

0.65 g. of 1,2-bis-(difluoramino)-ethylene diformamide was suspended in 4 ml. of trifluoroacetic anhydride, $(F_3CO)_2O$, and cooled in a wet ice bath, and 1.5 ml. of white 98 to 100% $HNO_3$ was added at 0° C. This was stirred overnight in an ice bath and the solid filtered to yield 0.48 g. of product, melting point 125° to 127° C. It had the following analyses:

Calc'd for $C_4H_4F_4N_6O_6$: C, 15.6%; N, 27.3%; F, 24.7%. Found: C, 16.4%; N, 27.6%; F, 23.1%.

The infrared and above chemical analysis are consistent with the structure of 1,2-bis-(difluoramino)-ethylene dinitrodiformamide.

*1,2-bis-(difluoramino)-ethylene dinitramine*

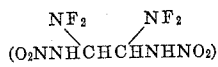
$$(O_2NNHCHCHNHNO_2)$$

0.23 g. of 1,2-bis-(difluoramino)-ethylene dinitro diformamide was dissolved in 50 ml. of diethyl ether. To this was added 0.1 cc. $H_2O$ and 3–4 drops of trifluoroacetic acid. The reaction was stirred overnight at room temperature, then the solvent was blown off in a stream of dry $N_2$. The solid residue was recrystallized from ethylene chloride to yield 35 mg. of product, melting point 144° to 147° C. It gave the following analyses:

Calc'd for $C_4H_4F_4N_6O_4$: C, 8.9%; N, 31.1%; F, 28.1%. Found: C, 9.00%; N, 30.1%; F, 28.4%.

The infrared and above analysis are consistent with the structure of 1,2-bis-(difluoramino)-ethylene dinitramine monohydrate.

The 1,2-bis-(difluoramino)-ethylene dinitramine monohydrate is represented by the following structural formula:

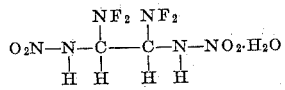

This compound, as formed, exists as a hydrate. The pure 1,2-bis-(difluoramino)-ethylene dinitramine, also termed 1,2-bis-($NF_2$)-1,2-dinitramino ethane, is a solid having a melting point of about 145° C. and is obtained by vacuum sublimation. Stability data on the pure compound show that it survives a heat treatment at 60° C. for 4 days under vacuum during the sublimation procedure. Determinations have shown this compound gives a specific impulse of 291 in a propellant composite containing 20% of a high-energy binder, such as a polymer having 2 $NF_2$ groups per 3 carbon atoms. This dinitramine oxidizer is particularly attractive since it is a solid.

The dinitramine may be used as one of the principal oxidizers, together with the dinitrate derivative, in a propellant composition containing suitable proportions of powdered metals, such as boron, aluminum, lithium and beryllium, and with admixed liquid $NF_2$-containing oxidizers, such as tetrakis $NF_2$ butane, tetrakis $NF_2$ furan, etc.

EXAMPLE 2

To 4.1 g. of 1,2-bis-(difluoramino)-ethyl isocyanate in 50 ml. of purified $CH_2Cl_2$ cooled to 0° C. was added 4 ml. of 99% formic acid. The reaction was allowed to warm to room temperature and stirred overnight. The solvent was removed in a warm water bath and the residue was distilled in a modified Hickman molecular still to yield a water-white product in about 80% yield with the following analyses:

Calc'd for $C_2H_5F_4N_3O$: C, 20.6%; N, 24.0%; F, 43.4%. Found: C, 21.2%; N, 24.2%; F, 43.6%.

The infrared and NMR spectra and the above analysis are consistent with the structure of N-(1,2-bis-(difluoramino)-ethyl) formamide.

*N-nitro, N-(1,2-bis-(difluoramino)-ethyl) formamide*

To 1.8 g. of N-(1,2-bis-(difluoramino)-ethyl) formamide in 5 ml. of trifluoroacetic anhydride was added 2 ml. of white 98 to 100% $HNO_3$. The reaction was stirred for 4 hours in an ice bath, then poured into 100 ml. of ice and water. The aqueous phase was extracted with $2 \times 50$ ml. portions of $CH_2Cl_2$. These were combined, reacted with solid $NaHCO_3$, then dried over anhydrous $MgSO_4$. The solid was filtered, the solvent removed on a warm water bath, and the residue distilled in a high vacuum cup still to yield a water-white product with the following analyses:

Calc'd for $C_3H_4F_4N_3O$: C, 16.4%; N, 25.5%; F, 34.5%. Found: C, 18.4%, N, 24.8%; F, 32.4%.

The infrared spectrum and above analysis are consistent with the structure of N-nitro, N-(1,2-bis-(difluoramino)-ethyl) formamide.

*1,2-bis-(difluoramino)-ethyl nitramine*
$$CH_2(NF_2)CH(NF_2)NHNO_2$$

To 20 ml. of 1 N HCl was added approximately 1.5 g. of N-nitro, N-(1,2-bis-(difluoramino)-ethyl) formamide. At first there were two phases, but after stirring at room temperature for 2 hours, the reaction was homogeneous. It was extracted with $4 \times 15$ ml. portions of $CH_2Cl_2$. These were combined, dried over anhydrous $MgSO_4$, and then the solvent was removed on a warm water bath. The residue was distilled to yield a water-white product with the following analyses:

Calc'd for $C_2H_4F_4N_4O_2$: C, 12.5%; N, 29.2%; F, 39.6%. Found: C, 13.1%; N, 28.7%; F, 38.3%.

The infrared and NMR spectra and the above elemental analysis are consistent with the structure of 1,2-bis-(difluoramino)-ethyl nitramine.

Although the herein described process has been shown to be useful for preparing the mononitramines and the dinitramines, it is of particular importance in making available the new primary dinitramine compounds containing difluoramino groups and having the general formula:

$$R(NF_2)_a(NHNO_2)_2$$

wherein R represents the substituted organic compound radical selected from the group consisting of alkanes having 2 to 6 carbon atoms, cyclohexane and tetrahydrofuran with difluoramino ($NF_2$) and nitramino ($NHNO_2$) substituents; the subscript *a* signifying the number of at least 2 to the number of carbon atoms in the compound to which the $NF_2$ groups are linked; and the two ($NHNO_2$) groups being linked to 1 to 2 of the carbon atoms of the organic compound radical. The representative dinitramines coming within this formula are 1,2-bis-($NF_2$)-1,2-dinitramino ethane having the formula

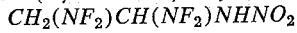

1,2-bis-($NF_2$)-1,1-dinitramino ethane having the formula $$(NHNO_2)_2CH(NF_2)CH_2(NF_2)$$

2,3-bis-($NF_2$)-1,4-dinitramino butane having the formula

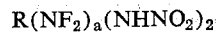

1,2,3,4-tetrakis-($NF_2$)-1,4-dinitramino butane having the formula

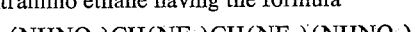

tetrakis ($NF_2$) dinitramino tetrahydrofuran, and dinitramino cyclohexanes having 2 to 6 $NF_2$ subtituent groups attached to the carbon atoms of the cyclohexane nucleus. In general, these primary dinitramines are distinctively normally solid compounds of high energy value. The energy value of these compounds is highest when at least 1 $NF_2$ group is linked to each carbon atom in the molecule.

While it has been shown that the potent difluoramino nitramines can be prepared from the corresponding NF$_2$-containing diisocyanates via the diformamide route, it is to be understood that modifications may be made in preparing the desired novel products.

The invention described is claimed as follows:

1. A compound having the formula:

$$R(NF_2)_a(NHNO_2)_2$$

wherein R represents the nucleus of a substituted organic compound from the group consisting of alkanes having 2 to 6 carbon atoms, cyclohexane and tetrahydrofuran, with difluoramino (NF$_2$) and nitramino (NHNO$_2$) substituent groups; the subscript $a$ signifying the number of at least 2 to the total number of carbon atoms in the nucleus to which the NF$_2$ substituent groups are linked, the two (NHNO$_2$) groups being linked to 1 to 2 of the carbon atoms of the organic compound nucleus.

2. A difluoramino-dinitramino substituted alkane consisting of a substituted alkane having 2 to 6 carbon atoms with a difluoramino group substituent linked to each of 2 to 6 carbon atoms and two primary nitramino groups linked to each of two terminal carbons as substituents in the substituted alkane.

3. 1,2-bis-(NF$_2$)-1,2-dinitramino ethane having the formula (NHNO$_2$)CH(NF$_2$)CH(NF$_2$)(NHNO$_2$).

4. 1,2-bis-(NF$_2$)-1,1-dinitramino ethane having the formula (NHNO$_2$)$_2$CH(NF$_2$)CH$_2$(NF$_2$).

5. 2,3-bis-(NF$_2$)-1,4-dinitramino butane having the formula $$(NHNO_2)CH_2CH(NF_2)CH(NF_2)CH_2(NHNO_2)$$

6. 1,2,3,4-tetrakis-(NF$_2$)-1,4-dinitramino butane having the formula $$(NHNO_2)CH(NF_2)CH(NF_2)CH(NF_2)$$
$$CH(NF_2)(NHNO_2)$$

7. Method of preparing a difluoramino-substituted and primary nitramino-substituted organic compound which comprises reacting an NF$_2$-containing isocyanate having the general formula:

$$R(NF_2)_a(NCO)_b$$

wherein R represents the nucleus of a substituted organic compound of the group consisting of alkanes having 2 to 6 carbon atoms, cyclohexane and tetrahydrofuran having the NF$_2$ group substituents attached to the carbon atoms interlinked therein, the subscript $a$ signifying the number of at least 2 to the total number of carbon atoms in the nucleus to which the NF$_2$ groups are linked, and the subscript $b$ signifying that 1 to 2 of the isocyanato (NCO) groups linked to 1 to 2 carbon atoms of the nucleus, with formic acid to convert the isocyanato (NCO) groups of the isocyanate to formamide groups, reacting the resulting formamide with nitric acid to form a nitro-substituted amide, hydrolyzing the nitro-substituted amide to remove a carbonyl group and form the nitramine function in place of the isocyanato function present in the starting isocyanate, and recovering the resulting nitramine corresponding to the NF$_2$-containing isocyanate in which the (NCO) groups are replaced by (NHNO$_2$) groups.

8. The method of preparing 1,2-bis-(difluoramino)-1,2-bis-dinitramino ethane which comprises reacting 1,2-bis-(difluoramino)-ethylene diisocyanate with formic acid to form 1,2-bis-(difluoramino)-ethylene diformamide, reacting said diformamide suspended in trifluoroacetic acid anhydride with nitric acid to form 1,2-bis-(difluoramino)-ethylene dinitro diformamide, hydrolyzing said dinitro diamine to convert it to 1,2-bis-(difluoramino)-ethylene dinitramine, and recovering said dinitramine.

References Cited

UNITED STATES PATENTS 3,310,444   3/1967   Gould et al. _____ 260—583 X

CHARLES B. PARKER, *Primary Examiner.*

CARL QUARFORTH, *Examiner.*

R. L. RAYMOND, J. W. WHISLER,
*Assistant Examiners.*